United States Patent
Schneider

[15] 3,681,520
[45] Aug. 1, 1972

[54] SYSTEM FOR IMPROVING THE SHARPNESS IN A COLOR TELEVISION PICTURE

[72] Inventor: Hans-Dieter Schneider, Gross-Gerau, Germany

[73] Assignee: Fernseh GmbH, Darmstadt, Germany

[22] Filed: April 15, 1971

[21] Appl. No.: 134,272

[30] Foreign Application Priority Data

April 16, 1970 Germany ............P 20 18 149.1

[52] U.S. Cl. .........................178/5.4 R, 178/DIG. 25
[51] Int. Cl. ................................................H04n 9/04
[58] Field of Search.........................178/5.4, DIG. 25

[56] References Cited

UNITED STATES PATENTS 3,536,826 10/1970 McMann, Jr...............178/5.4 R

*Primary Examiner*—Richard Murray
*Attorney*—Michael S. Striker

[57] ABSTRACT

Either the red, green, or blue color signals or the red and blue color signal and a luminance signal are applied to the input of non-additive mixing means at whose output appears the color signal having the largest amplitude. The so-selected color signal serves as an input to aperture correction means. The aperture correction signal formed in response to the color signal of largest amplitude is added to all three color signals when the red, green, and blue signals are furnished, and to the luminance signal alone when the red, blue, and luminance signals are furnished.

7 Claims, 2 Drawing Figures

Inventor:
Hans-Dieter Schneider by [signature]
Attorney

SYSTEM FOR IMPROVING THE SHARPNESS IN A COLOR TELEVISION PICTURE

BACKGROUND OF THE INVENTION

The invention relates to a color television camera system. The basic purpose of the invention is to increase the sharpness of the television pictures reproduced by the camera signals.

As a result of imperfections in the production and transmission of the picture signals, and as a result of the conversion of the picture signals into a television picture, the sharpness or resolution of the picture does not achieve the value which is theoretically possible on the basis of the scanning standard. Considering only the production of the picture signals, a resolution loss takes place because the scanning spot is not limited to the size of a picture element, but also embraces the adjacent picture elements. For the purpose of minimizing this resolution loss, known systems use an aperture correction. According to a previously preferred method of aperture correction, correction signals are derived from those picture elements which lie adjacent the scanned picture element both in the horizontal direction and in the vertical direction, these correction signals being subtracted in a suitable ratios from the signal of the scanned picture element. A practical example of an aperture corrector operating according to this method is described in applicant's U.S. Patent application No. 747,509.

In the application of this method for reducing the resolution loss in a color television system, it is possible to subject all of the camera signals to aperture correction. A disadvantage in this connection is the fact that the signal-to-noise ratio is reduced in all the camera signals and that it is hardly possible to avoid the appearance of registration errors in a more intensified form than would be the case without aperture correction.

Finally, the capital outlay is considerable because a plurality of aperture corrections, usually three, are necessary.

To avoid this disadvantage, it is already known to derive the correction signal only from a single camera signal and then to add this to all the camera signals. In this method, preferably the correction signal is derived from the color signal of the primary color "green," because this signal makes the greatest contribution to the luminance signal, while also usually having the greatest amplitude and the best signal-to-noise ratio (German application No. 1,512,352). ).

However, when the above described method of contour enhancement is applied in a color television camera having three camera tubes, namely for the red, the green, and the blue signal, it has the disadvantage that the contours are not enhanced for scenes having saturated color patterns in the red and blue spectral region, so that for such scenes the resulting image is lacking in sharpness.

SUMMARY OF THE INVENTION

It is an object of the present invention to avoid the above-mentioned disadvantages of the conventional color television camera system.

This invention comprises a color television system wherein a first, second, and third camera signal are furnished. The three camera signals apply to the input of selecting means at whose output appears the camera signal having the largest amplitude. The so-selected camera signal is connected to the input of aperture correcting means. These aperture correcting means furnish an aperture correcting signal in response thereto. The aperture correction signal is in turn added to at least one of the camera signals.

In a preferred embodiment of the present invention, the selecting means comprise a non-additive mixing stage (NAM).

It will be noted that in the present invention, it is always the color signal having the largest amplitude which is furnished to the aperture correcting means. This contrasts with the conventional system wherein one predetermined color signal, generally the green signal, is used as an input for the aperture corrector. Thus, an improvement of the picture sharpness is achieved by the present invention even in those parts of the picture which do not happen to contain the color components whose color signal had been selected for aperture correction. In this way the above-mentioned disadvantage of the known color television systems is avoided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
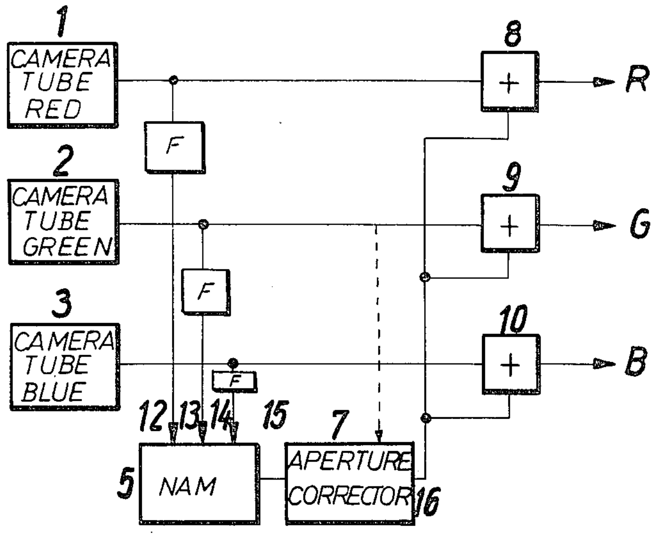
FIG. 1 shows a television camera system with three camera tubes which produce color signals for the three primary colors red, green, and blue.

In FIG. 1, a camera tube shown at 1 furnishes the red signal, a camera tube 2 furnishes the green signal, and a camera tube 3 furnishes the blue signal. The three color signals for red, green, and blue are delivered to the inputs 12, 13 and 14 of a non-additive mixing stage 5 (NAM). This stage 5 represents an OR circuit, which allows only the signal with the largest amplitude to be furnished at output 15 and blocks the two other signals. This is a circuit well known in the art, one embodiment Vol. which may be seen in Journal of the SMPTE, Volume 73, Aug. 1964, page 658.

The output 15 of stage 5 is connected to the input of the aperture corrector 7. The aperture corrector 7 is preferably an arrangement which delivers a correction signal in the horizontal and vertical direction, as shown, for example, in Journal of the SMPTE, Volume 69, June 1960, page 395 to 401.

From output 16 of aperture corrector 7, the correction signal is delivered to three adding stages 8,9, and 10, and added with suitable polarity and amplitude to the color signals produced by the camera tubes 1,2, and 3 in such a manner that the output signals red, green, and blue of the system are aperture corrected in the desired manner. From the three aperture corrected color signals red, green, and blue, there are formed the luminance signal and the chrominance signals, for example, the color difference signals R–Y and B–Y, this being performed in a known manner by means of a matrix circuit (not shown in the drawing).

Figure 2:
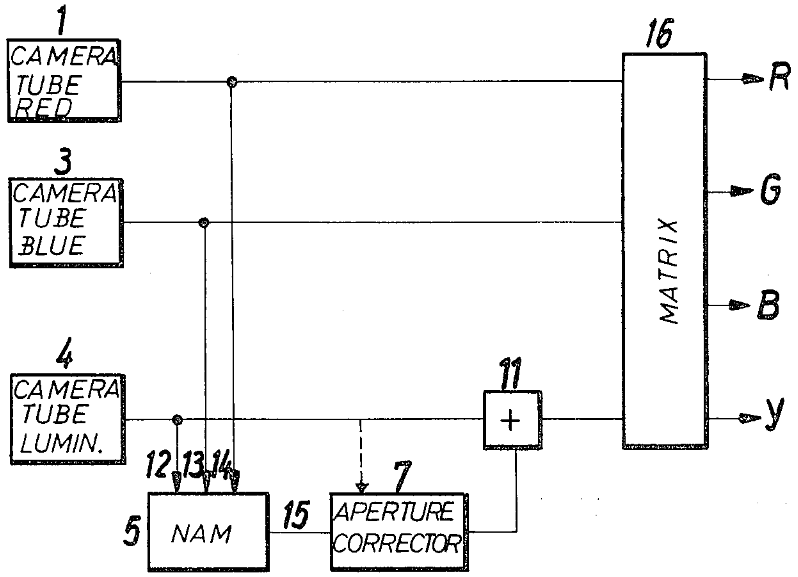
FIG. 2 shows a color television camera system with a separate camera tube for the production of a luminance signal or white signal.

FIG. 2 shows the application of the invention to a color television camera system, in which a separate camera tube 4 is provided for production of a camera signal which corresponds substantially to a luminance signal. In addition, there are provided two or three camera tubes for the production of color signals. In the present case, there are two camera tubes, numbered 1 for the red signal and 3 for a blue signal. The three camera signals, or, in the case of a four-tube camera, the four camera signals are delivered to the inputs 12,13,14 of a non-additive mixing stage (NAM), which takes care that at any time only the largest of the three camera signals is furnished to aperture corrector 7. However, this arrangement departs from that shown in the example according to FIG. 1, in that the correction signal is mixed only with the separate luminance signal from camera tube 4 in adding stage 11. The green signal G and, possibly, a corrected luminance signal Y, are obtained in a known manner by means of matrix circuit 16 from the color signals for red and blue coming from the camera tubes 1 and 3 respectively, and the aperture corrected luminance signal.

By the use of the present invention, it is possible to ensure, even in this case, that a correction signal is formed independently of the picture content. This is of importance, particularly if camera tube 4 embraces a somewhat narrower spectral range than that of the curve for the sensitivity of the human eye, and therefore gives a relatively small signal amplitude for saturated colors in the red and the blue spectral region.

According to a further development of the invention, the vertical component of the aperture correction signal is derived only from the green signal in the arrangement according to FIG. 1, or from the luminance signal in the arrangement according to FIG. 2, while the horizontal component of the aperture correction signal is formed from all the camera signals as described above by means of a non-additive mixing stage.

In many cases, it can be of advantage to furnish only the high frequency components of the video signals to the non-additive mixing stage (NAM). In this case, suitable filters must be provided, the outputs of said filters being connected to the inputs of the NAM stage (5) in both FIGS. 1 and 2.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a color television system having means for furnishing a first, second, and third camera signal, an arrangement for increasing the sharpness of the reproduced image, comprising, in combination, aperture correcting means having an aperture correcting input and an aperture correcting output, and furnishing an aperture correction signal at said aperture correction output in response to a signal applied at said aperture correcting input; selecting means, having a selecting output, and furnishing, at any given time, a selection output signal at said selecting output, said selection output signal corresponding to the one of said first, second, and third camera signals having the largest amplitude at said given time; means connecting said selecting output to said aperture correcting input; and combining means combining said aperture correction signal with at least one of said first, second and third camera signals.

2. An arrangement as set forth in claim 1, wherein said selecting means comprise non-additive mixing means.

3. An arrangement as set forth in claim 1, wherein said first, second, and third camera signals comprise, respectively, the red, green, and blue color signals; and wherein said combining means comprise first, second, and third adder means respectively adding said aperture correction signal to said red, green, and blue color signals.

4. An arrangement as set forth in claim 1, wherein said first, second, and third camera signals respectively comprise a red and blue color signal and a luminance signal; and wherein said combining means comprise adder means adding said aperture correction signal to said luminance signal.

5. An arrangement as set forth in claim 1, wherein said aperture correction signal has a vertical and horizontal component; and wherein said aperture correcting means comprise means furnishing said horizontal component in response to said selection output signal and means furnishing said vertical component in response to a predetermined one of said camera signals.

6. An arrangement as set forth in claim 5, wherein said predetermined one of said camera signals is the green color signal.

7. An arrangement as set forth in claim 1, further comprising means for filtering low-frequency components from said camera signals prior to application to said selecting means.

* * * * *